July 11, 1967  A. TREHUB  3,331,054
LEARNING MACHINES AND METHODS
Filed May 20, 1964  4 Sheets-Sheet 2
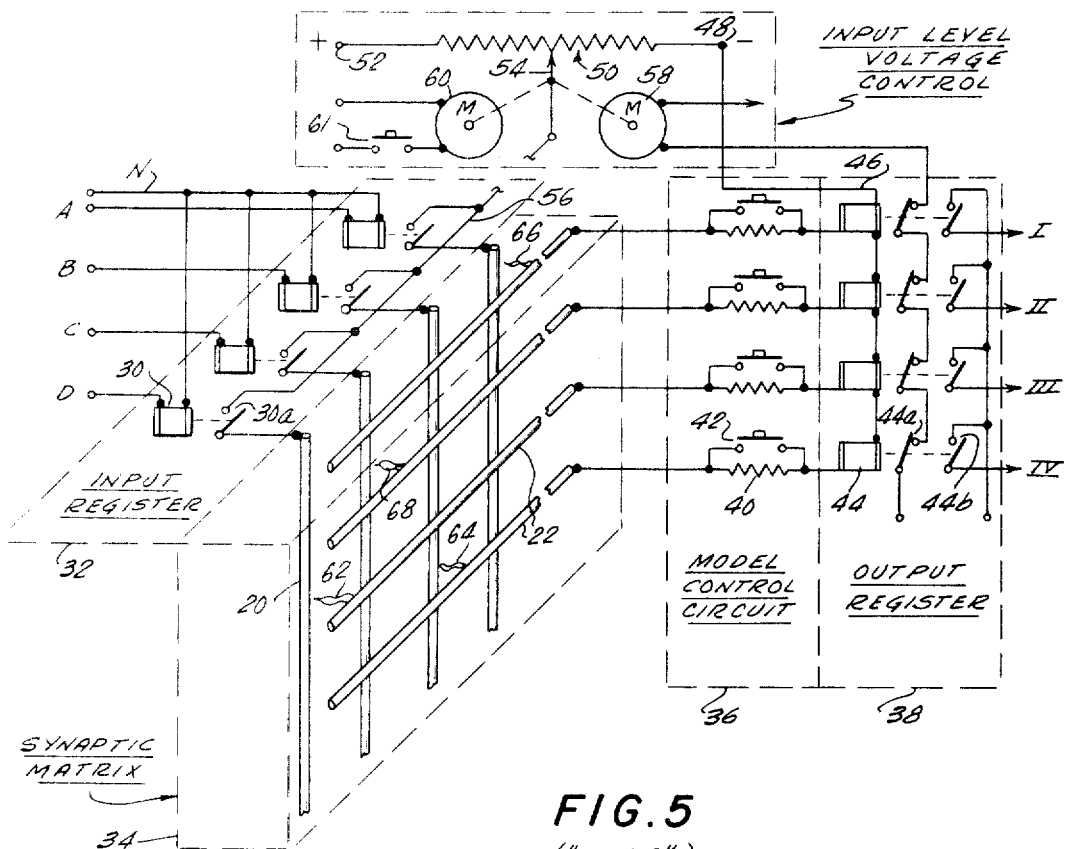
FIG.5 ("MIMIC")
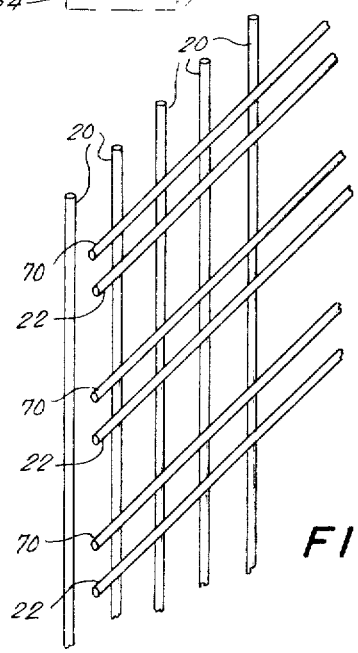
FIG.5A
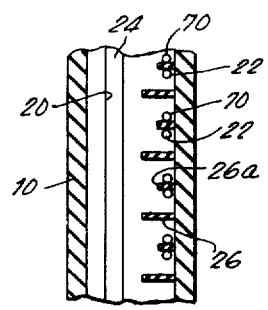
FIG.5B
INVENTOR.
ARNOLD TREHUB
BY Annter & Rolatin
ATTORNEYS

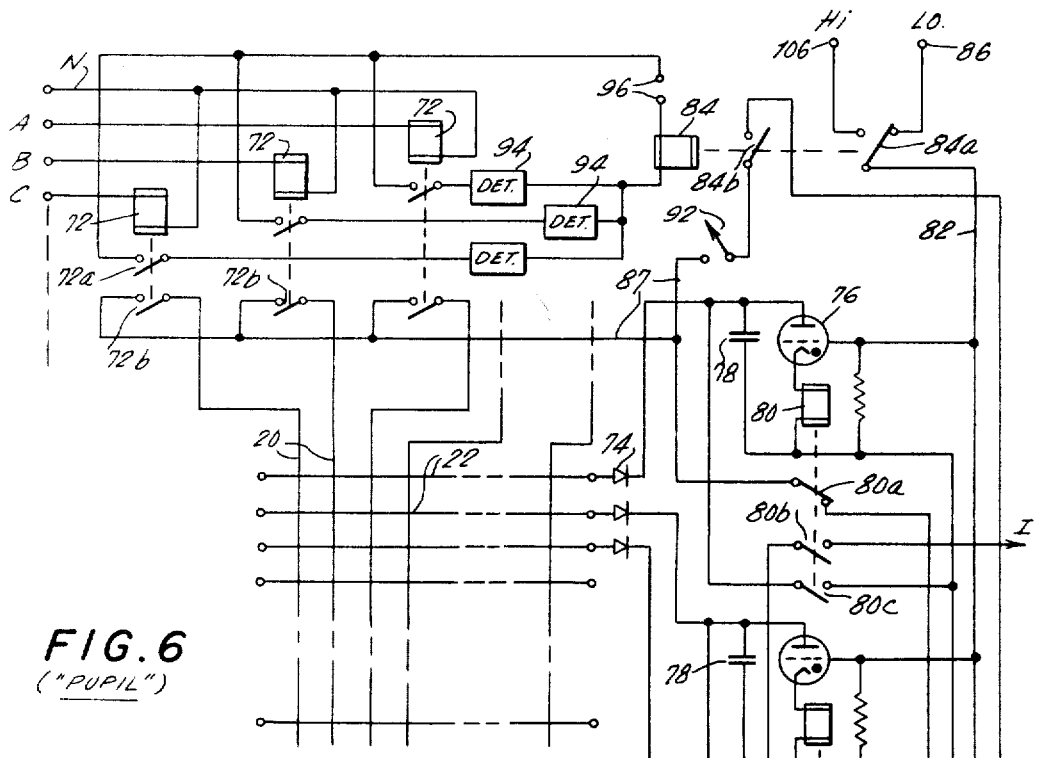
FIG. 6 ("PUPIL")
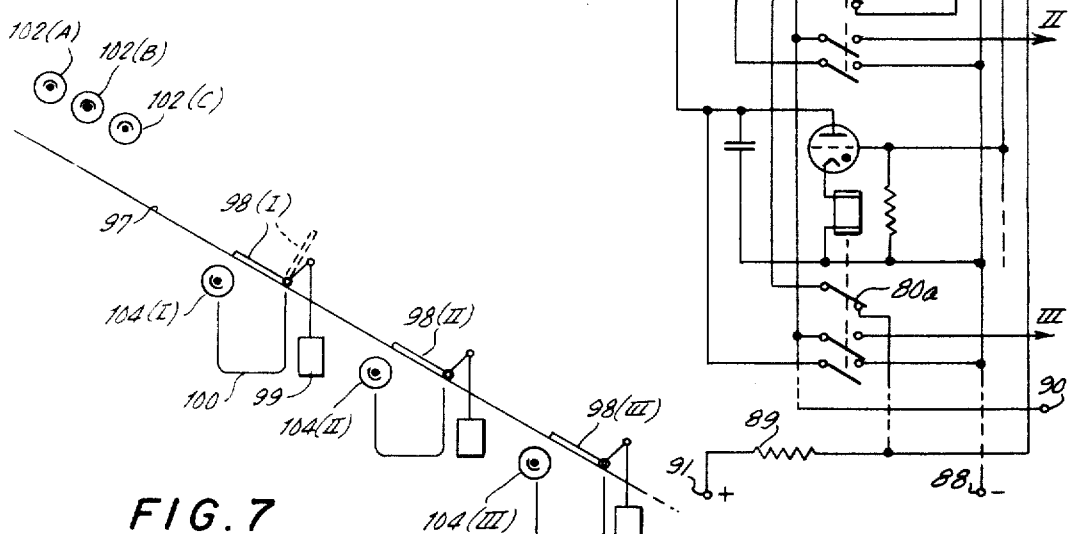
FIG. 7

United States Patent Office 3,331,054
Patented July 11, 1967

3,331,054
LEARNING MACHINES AND METHODS
Arnold Trehub, 145 Farview Way,
Amherst, Mass. 01002
Filed May 20, 1964, Ser. No. 368,922
16 Claims. (Cl. 340—172.5)

The present invention relates to electrical apparatus of broad application in which signals at various input points selectively govern the response of the apparatus.

An object of the invention resides in provision of novel electrical apparatus adapted to generate and establish within itself, selectively, certain current paths in what may be called a learning process, and in providing methods of inducing selective formation of desired response-controlling current paths. Automatic performance of the same apparatus is subsequently governed by the current paths thus generated. The sequence may be compared with the behavior of living things in responding or reacting in desired ways to certain stimuli, where such behavior is the result of a previous learning or conditioning process.

A wide variety of automatic electrical apparatus has come into use in which input criteria are presented to or impressed on the apparatus and which are sensed. As a result of existing internal current paths, the apparatus responds by executing various acts corresponding to the sensed criteria.

A further object of the present invention resides in providing apparatus wherein the internal action-reaction current paths are selectively generated within the apparatus and in which the selectivity is the result of conditions closely analogous to a learning process.

In one form of natural learning processes an animal or a person may be exposed to a particular stimulus, and may react in a great many different ways. Thus, an uninformed person may be asked a question and may make random guesses as to the answer. His tutor will provide encouragement when the correct answer is given. Because of this recognition the person "learns" what was accepted as the correct answer. In his brain changes take place at synaptic junctions which he unconsciously utilizes subsequently in giving the learned answer in reply to each familiar question. There is no need for intervention of the tutor when a familiar question is asked.

A further object of this invention resides in the provision of novel apparatus having the capacity to generate internal current paths analogous to changes at synaptic junctions between input lines and output lines forming a matrix. More specifically, an object of the invention resides in the provision of a novel synaptic matrix.

In an analogy to the foregoing natural learning process, one form of the novel apparatus responds in the manner of a pupil who may give many wrong answers but who is encouraged or rewarded when he gives the desired response and thereby learns to repeat the desired response. In this aspect of the invention, novel electric apparatus is provided which is initially capable of reacting arbitrarily in many different ways to signals impressed at selected input lines, wherein the apparatus has many output lines and has means for developing desired internal input-output current paths during repeated supervised operations. In such operations, the "untutored" apparatus itself makes random selections among all the possible current paths. The apparatus is equipped to augment the probability of desired random-selected paths. Such desired paths become preferential paths and are converted ultimately into internal established current paths between certain input lines and selected corresponding output lines.

The foregoing apparatus responds to acceptance or recognition of its occasional or random correct performance by "learning" to repeat such correct performance.

In another natural learning process, a person may be asked a question and then he is told the correct answer. He learns to repeat stated answers in response to familiar questions. In this process as in the other, it is believed that changes take place at synaptic junctions which store the correlations between questions and answers. However in this process, he acts as a mimic, repeating each answer in accordance with the instruction from his tutor during the learning process.

Apparatus adapted to learn and perform as a "mimic" is provided in accordance with a further feature of the invention.

As will be seen, the disclosed embodiments of both "mimic" and "pupil" utilize a novel synaptic matrix. Apparatus is disclosed below that "learns" in a manner analogous to the "mimic" learning process just discussed where this apparatus includes means for deliberately developing desired input-output current paths between selected input lines and selected output lines of the matrix. Apparatus disclosed below "learns" in the manner of "pupil" where the matrix develops individual input-output current paths at random, and common means is provided for enhancing or even firmly establishing such random-developed current paths in instances when the response is recognized as correct or desirable.

In the illustrative apparatus, the current-path forming means is such that no physical access is required to each input-ouput cross-over for establishing the desired circuit path. Consequently, the "untutored" matrix can be located deep inside the circuit apparatus. Many layers of input-output lines may be compactly stacked in providing a large-capacity matrix. No special parts need be prepared at each of the many input-output cross-overs for enabling a cross-connection to be made. Plural connections may be established from one input line to several output lines, and from plural input lines to one output line.

The "tutor" that provides guidance for encouraging formation of desired paths may be a human supervisor, but this is not necessarily the case. As will be seen, there are systems whose overall performance differs in dependence on various conditions, and in which the system functions itself to recognize the desired response and to "learn" to respond in the "desired" way automatically, been guided by comparison with a prescribed criteria.

The nature of the invention, including the foregoing as well as other objects and novel features, will be more fully understood and appreciated from the following detailed description of various illustrative embodiments which are shown in the annexed drawings. In the drawings:

FIG. 5 is a wiring diagram of a learning machine that includes the synaptic matrix of FIGS. 1 to 3, the electrodes of the matrix appearing in perspective in FIG. 5;

FIG. 5A is a modification of the electrode assembly of FIG. 5;

FIG. 5B is a fragmentary vertical cross-section of a matrix embodying the electrode assembly of FIG. 5A;

FIG. 6 is a wiring diagram of another form of learning machine embodying further features of the invention and including the matrix of FIGS. 1 to 3;

FIG. 7 is a diagrammatic representation of sorting apparatus illustrating an application of the apparatus of FIG. 6;

Figure 9:
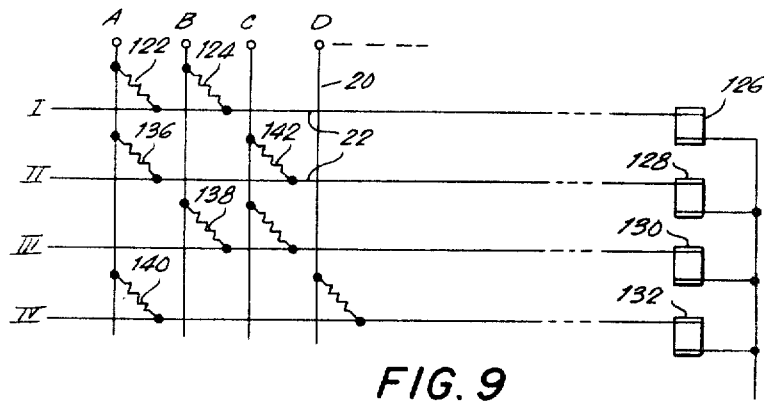
Figure 10:
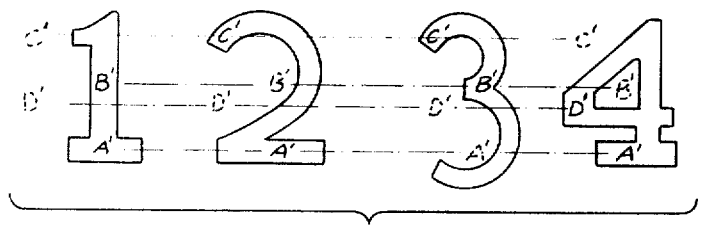

FIG. 9 is a wiring diagram illustrating a "taught" matrix in an application of the matrix and learning machines of the previous figures, wherein multiple control signals are effective in combination for selecting a single output channel; and FIG. 10 is a set of numerals together with a pattern of photocell detectors used in connection with each numeral, the detectors being represented by alphabetic characters in solid lines or broken lines in accordance with their coincidence with the numerals, such photocells being suitable for supplying input signals to the matrix of FIG. 9.

Figure 1:
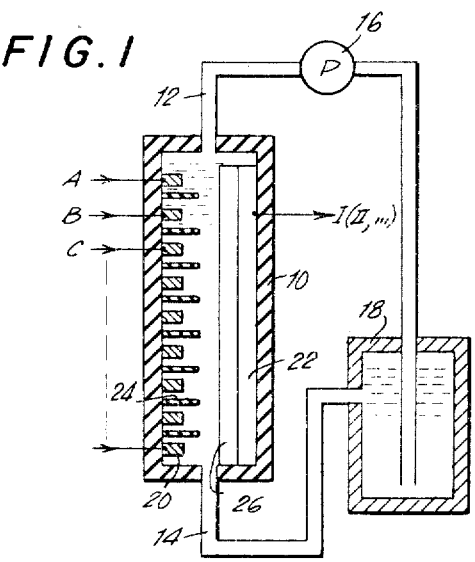
FIG. 1 is a diagrammatic representation of an embodiment of certain features of the invention, including a vertical cross-section of a novel synaptic matrix as viewed from one side.

Referring now to FIG. 1, certain physical aspects of one form of synaptic matrix are illustrated. The matrix includes a container 10 of insulating material that is sealed against liquid leaks, the container having an inlet line 12 and an outlet line 14. An electrolyte is circulated through lines 12 and 14 and container 10 by a pump 16 from a reservoir 18 whose capacity is large enough to maintain a reasonably uniform composition of the electrolyte during the use of the matrix. The electrolyte that is supplied to container 10 by line or tube 12 displaces another volume of electrolyte that is returned to reservoir 18 via line 14.

Figure 3:
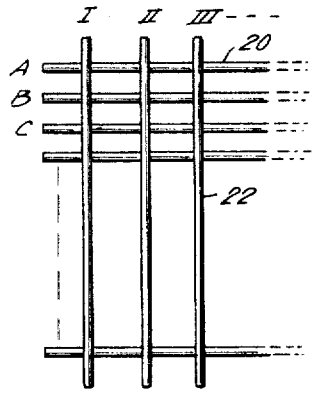
FIG. 3 is a diagrammatic front view of the electrode assembly in FIG. 2.

Along the left-hand wall of container 10, as viewed in FIG. 1, there is a series of metal anodes 20 in the form of fine bars or rods to which respective external connections may be made. These anodes and their terminals are individually designated A, B, C, etc. and these individual designations are used in the other figures discussed below. A series of elongated cathodes 22 are disposed parallel to each other, and extend vertical against the right-hand wall of container 10. Cathodes 22 thus extend at right angles to anodes 20, when viewed from the left or the right of FIG. 1. In FIG. 3, a typical group of anodes A, B and C are shown extending horizontally behind a group of vertically extending cathodes I, II, III, etc. Where the vertical and horizontal electrodes appear to cross one another, they are actually spaced apart as is clear from FIG. 1; and notably the minimum spacing between each cathode and each anode where a crossover exists is equal to the spacing at every other crossover.

Between each anode 20 and its neighbor there is a blade of insulation 24 and correspondingly there is a blade of insulation 26 between each cathode 22 and its neighbor. These insulating blades or separators are wider than the electrodes, but they are not so wide as to inhibit seriously the flow of electrolyte between line 12 and line 14.

Figure 2:
FIG. 2 is a diagrammatic view of the electrode assembly of the matrix in FIG. 1, as seen from the same side and including an input-output current path.

In the normal use of the matrix of FIGS. 1 to 3, direct current is controlled so as to flow between any selected anode and any selected cathode, under a condition chosen to induce formation of dendritic projections from the selected cathode towards the selected anode in the region where they cross. Such a dendrite 28 is illustrated in FIG. 2.

It is desirable to avoid attack on anodes 20 when providing the material for growth of the dendrites, and for this reason the preferred anode is a non-depositing type of anode well known in the art of electroplating, for example, platinum. Where non-depositing anodes are used, the electrolyte contains a dissolved metal salt. The details of the electrolyte, the electrodes and the proper concentrations and current densities are details well known in the art of electroplating and are omitted here inasmuch as they do not, per se, form part of the present invention.

The growth of material by electrodeposition when a potential difference is applied between a selected anode and a selected cathode for a sufficient time period results in effectively providing a circuit path in the form of a dendrite extending from the cathode to, or nearly to, the anode. It is not necessary that the electrodeposition process be continued until the dendrite extends fully and solidly from the anode to the cathode, but part of that path may be supplied by conductivity through the liquid. Indeed it is desirable for the grown circuit connection to be resistive in certain applications of the invention, as will be clear from the discussion of FIGS. 9 and 10 appearing below.

It is notable that the circuit connection between the selected electrodes in each instance is made without any physical access to the electrode crossing. In the synaptic matrix described, there is no physical equipment to be provided in advance that is shaped and assembled for constituting a circuit connection at a cross-over, and there is no need for a switch or push button or any other discrete connection-forming structure at any cross-over, such as may be found in certain selective mechanical "crossbar" matrixes.

After all the desired cross-over current paths have been established, it will be found desirable in some situations to replace the metal-ion electrolyte with a non-depositing electrolyte. Such substitution of electrolyte is effected where direct current is used in normal operation of the circuits that have been established through the matrix. Such operating current might in time develop spurious interconnections by continuing to deposit metal at a slow rate. To avoid this effect without replacing the metal-ion electrolyte, alternating current may be used in the circuits through the matrix. However, where the matrix is to retain its capacity to form additional current paths, such as dendrite 28, the metal-ion electrolyte is retained.

The novel matrix may be made extremely small, using fine wires as the electrodes, and they may be packed together closely so that a large number of circuit connections may be made in a matrix that is extremely small in volume. It is contemplated that matrixes may be made where the electrode spacing is no more than 20 electrodes to the inch, and theoretically they may be much closer. Correspondingly, the separation of the anodes from the cathodes may be an extremely small dimension, for example 0.1 inch. As a result, there is a very real possibility of establishing a large number of circuit connections in a very small volume, and this represents an important advantage of the form of matrix illustrated. Also, as many current paths may be established from each electrode of one group to selected electrodes of the other group as may be desired.

Figure 4:
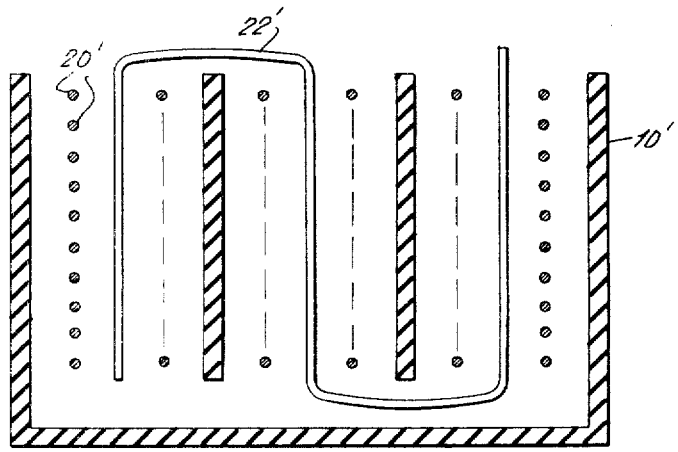
FIG. 4 is a greatly enlarged cross-section of a modified form of electrode assembly in a novel synaptic matrix.

Different electrode arrangements can be made in which constant spacing exists between each anode and each cathode at the respective cross-over points, a modification of FIGS. 1 to 3 being illustrated in FIG. 4. Horizontally extending anodes 20' are shown in FIG. 4 as being disposed in six vertical planes that are distributed at opposite sides of three vertical segments of the cathodes 22'. Each cathode 22' is S-shaped in the illustration, and it is understood that plural side-by-side cathodes 22' are to be included. It will be appreciated that this drawing is purely diagrammatic and that the relative spacings between the cathodes and anodes in practice will normally be very different from that illustrated, and insulating barriers of various forms will ordinarily be present such as barriers 24 and 26 in FIG. 1. FIG. 4 demonstrates, however, that various configurations of the electrodes may be devised. In this way very large numbers of anodes and cathodes can be integrated into a single matrix for providing an enormous selective capacity of circuit interconnection. In FIG. 4 the electrolyte in container 10' is assumed to be sufficient for providing metal-ions sufficient for the required connections without resort to electrolyte circulation. In such a case, the electrolyte may be in the form of a gel.

An application of the matrix of FIGS. 1 to 3 in a learning machine is shown in FIG. 5 which illustrates a number of additional significant features of the invention. In FIG. 5 cathodes 22 extend horizontally in a vertical plane that is spaced from a parallel plane containing vertically disposed anodes 20. A number of storage elements in the form of latching relays 30 are provided with normally open contacts 30a, there being one such input storage element for each anode 20. Relays are used in this example as being well suited to a concise description of the apparatus and its operation, but it will be appreciated that a wide variety of other storage elements may be used, where storage elements are needed. Suitable bistable solid-state components and circuits are well known storage elements in the art of computers. An individual input terminal A, B, C, D, etc. is provided for the respective storage elements 30 and the corresponding anodes 20. Application of direct current to any one of the terminals A, B, C or D in relation to the return conductor N energizes that relay and, as a latching relay, each relay 30 retains the stored bit of information represented by its energization until the latching relay is released subsequently.

Relays 30 are collectively referred to as an input register 32. This register stores the selective bits of information supplied to terminals A, B, C and D and applies positive potential to the corresponding anodes 20 of synaptic matrix 34. The cathodes of this matrix are connected to a model control circuit 36, and, in turn, to an output register 38.

Each cathode 22 extends to a resistor 40 across which there is connected a normally open manually operable switch 42. The resistor and the switch in turn are connected to a relay 44 having contact sets 44a and 44b. The contacts 44b have a common connection to a source of energization, and each contact 44b has a respective output line I, II, III or IV identified with a respective cathode 22.

Relays 44 have a common return connection 46 to the negative terminal 48 of a direct current supply. A potentiometer 50 is connected between negative terminal 48 and positive terminal 52 of the direct current supply. The slide contact 54 extends via a common positive line 56 to all of the relay contacts 30a. When selected relay contacts are closed, corresponding anodes 20 are energized in relation to the various cathodes 22.

Relays 44 have their contacts 44a connected in series. Contacts 44a are normally closed, and they provide a control circuit to motor 58 that is interrupted to deenergize the motor in the event that any one of the contacts 44a is opened. Motor 58 is arranged to move slide contact 54 from its extreme negative position gradually towards the positive terminal of the potentiometer. Another motor 60 and its control switch 61 are provided for driving slide contact 54 in the opposite direction when this proves desirable, although a single reversible motor and suitable control circuits can replace the two motors 58 and 60 shown.

The operation of the apparatus in FIG. 5 may now be described. At the outset, it may be assumed that all of relays 30 and 44 are deenergized, that there are no connections between any of the anodes 20 and the cathodes 22, and slide contact 54 of potentiometer 50 is at its extreme positive position.

Let is be assumed that a circuit connection is to be established for causing cathode 22 corresponding to output terminal III to be energized whenever input is supplied to terminal D. The apparatus of FIG. 5 is of a form that behaves very much like a mimic receiving instruction. For example, the mimic is instructed that when it receives a "D" signal (in this example) it is to provide a "III" response.

In order to achieve this effect, the "tutor" causes a bit of information to be presented to terminal D and thereby causes the "D" storage element 30 to become energized and latched, to retain that bit of information. The "tutor" depresses the switch 42 identified with output line III. Current then flows from slider 54 to a selected anode 20; and some small value of current also flows from the selected anode 20 to each of the cathodes 22 through their respective resistors 40 and relays 44, thence to the negative terminal 48. However, because the switch 42 identified with line III has been closed and the associated resistor 40 has been short-circuited, the current in cathode 22 identified with line III is greater than the currents to the other cathodes by a substantial margin. This enhanced current flow in the selected cathode results in an accelerated electrodeposition of metal and growth of a dendrite 62 from cathode 22 identified with line III toward anode 20 identified with the latched relay 30 of line D. After an appropriate time interval for a sufficient growth of dendrite 62 or "synapse," the "mimic" or the synaptic matrix may be considered as having assimilated the instruction and switch 42 of line III is opened. The latched relay 30 is released, and the apparatus is then in condition for its next bit of instruction. In like manner, other dendrites 64, 66 and 68 may be added to the matrix, thereby establishing selective circuit interconnection between certain anodes and certain cathodes and consequently providing preferred circuit connection between any of the input lines A, B, C, D and the related output lines I, II, III, IV. It will of course be appreciated that the number of anodes and the number of cathodes may be considerably increased beyond the capacity illustrated in FIG. 5, and this would normally be the case where any substantial large quantity of information is to be supplied and sorted out by selective response through the matrix.

In subsequent use of the apparatus after current paths 62, 64, 66 and 68 have been established, slider 54 is moved to its extreme negative position, and with motor 58 energized via the normally closed series contacts 44a of the various relays, motor 58 starts to drive slide contact 54 towards the positive terminal. One of the latching relays 30 is energized by energizing a terminal A–D, so that current through one of the dendrites to one of the relays 44. Motor 58 continues to operate until the current reaching that relay rises sufficient to cause relay operation. This opens the associated contacts 44a and deenergizes the motor. At this point it is established that one of the relays 44 will be energized in response to a related closure of a contact set 30a. Some current may reach the other relays 44 by way of leakage current paths through the matrix, but such leakage current is entirely inadequate to provide any operation of an unintended relay 44 and therefore none of the output terminals I, II, III or IV except that related to the energized relay 30 will be activated by closure of a corresponding contact set 44b.

The "taught" matrix is then ready for service. Information is supplied in the form of sequential current pulses to terminals A–D. Corresponding circuit connections are completed via contacts 30a, the related anode 20, to a selected cathode 22 through the previously established dendrite, via resistor 40, to energize a selected relay 44. One set of relay contacts 44b closes and an output circuit I, II, III or IV is energized. After each bit of information reaches the proper output circuit, relays 30 are unlatched (by known reset means) and the circuit is in readiness for the next bit of information.

From time to time it may be desirable to eliminate one of the dendrites 62, 64, 66 or 68 at any particular cross-over, for correcting an error for some other purpose. This might be achieved by reversing the polarity of the D–C supply, for reverse current-flow or deplating at the selected anode-and-cathode cross-over. Rather than to do this, however, it may be preferred to employ a matrix of the form illustrated in FIG. 5A. In that figure there are additional electrodes 70 that are companion to the various cathodes 22. These electrodes 70 are to be energized selectively or as a group so as to be negative relative to any selected cathode 22 that bears the objectionable dendrite. The dendrite metal is thus electrolytically stripped from its cathode or from the cathodes as a group, depending on the energization. It will be appreciated that the electrode assembly represented in FIG. 5A is to be incorporated in a matrix precisely the same as that in FIG. 1 and used in a learning machine as in FIG. 5 or 6. Insulating dividers 26 are provided (FIG. 5B) between each cathode 22 and the next. It may be desirable to provide additional insulating spacers 26a between a companion pair of electrodes 70 and 22, spacers 26a being somewhat narrower than the separators 26 between each pair of electrodes 22–70 and the adjoining pairs of such electrodes.

Further important aspects of the invention are represented in another learning machine shown in FIG. 6, utilizing the matrix of FIGS. 1 to 3, inclusive. Where the learning machine of FIG. 5 may be termed a "mimic," FIG. 6 represents a type of learning machine that may be termed a "pupil." This is because of the manner in which it learns to respond to bits of information supplied at its input terminals. The "pupil" receives a bit of information, and initially it produces a response at an output line selected purely by chance. When that occurs, and such response is undesirable in all probability, the "pupil" is simply caused to recycle, to arrive at a different response. After a number of tries, the "pupil" makes the desired selection. When this occurs, the selection process that has just been executed at random by the "pupil" establishes an anode-to-cathode path at a particular cross-over; and this path is enchanced or reinforced. Subsequently, when that bit of information is again presented at the same input line A–D and at the corresponding anode 20, then the pupil will very probably produce the desired response again by selecting the desired output line. The probability of the pupil making this selection is dependent upon the extent to which the random-selected current path was reinforced. In some applications, where the "pupil" is used to develop its own response in the face of statistical variables, it may be undesirable to have the learning process take place completely the first time that a desired selection is made. When desired selections are made repeatedly and there is further enhancement of each particular selection, there will be a greater probability—even a certainty—of yielding a desired response. On an occasional event when a marginal condition leads to presentation of a bit of information to an input terminal A to D, and the selected current path is reinforced, such marginal event does not produce undue consequence where only limited circuit-path enhancement takes place.

Turning now to FIG. 6, any number of input lines A, B, C, etc. are provided, and these are connected to bit-storage elements 72. These bit storage elements are represented as self-latching relays each having two sets of normally open contacts 72a and 72b. The relays have a common neutral or negative return line N. A signal that is momentarily impressed on any one of the terminals A, B, C, etc. energizes the corresponding relay 72 which is held in its operated condition until it is unlatched.

One contact of the normally open set of contacts 72b of each relay 72 extends to a corresponding anode 20 of a synaptic matrix, such as that in FIGS. 1 to 3. Cathodes 22 of this matrix correspond to output terminals I, II, and III, etc. These cathodes are connected via diodes 74 to respective anodes of thyratrons 76 and to one terminal of a corresponding capacitor 78. A relay 80 is connected in the cathode return circuit of each thyratron 76, and capacitor 78 is connected between the thyratron anode and the negative return of relay 80. The thyratron grids extend via line 82 and selector contact 84a of a relay 84, to a normal low value of operating bias at terminal 86. The low bias is effective when relay 84 is not energized and its contact 84a is set as illustrated.

Each relay 80 has three pairs of contacts, including normally closed contacts 80a, and normally open pairs of contacts 80b and 80c. A positive potential supply circuit may be traced from relay contacts 72b via the line 87 through the successive sets of relay contacts 80a in series, to current limiting resistor 89 and the positive terminal 91 of a direct current supply. A negative-return circuit may be traced from negative terminal 88 of this direct current supply, directly to the negative-return terminal of each of the capacitors 78 and the relays 80.

When any relay contact 72b closes at the start of a "learning" process, a displacement current flows in all of the capacitors 78 between positive terminal 91 and negative terminal 88. More particularly, this displacement current flows through the circuit including resistor 89, relay contacts 80a in succession, line 87, the selectively closed relay contacts 72b, the corresponding anode 20, each of the cathodes 22, each of the diodes 74 and the capacitors 78, ultimately to negative terminal 88.

Individual output terminals designated I, II, III, etc. are connected to normally open relay contacts 80b, the common terminals of which are energized by connection to terminal 90 of a power supply for the output circuits. Whenever one of the relay contacts 80b is closed, the corresponding terminal I, II, III, etc. is energized by supply terminal 90.

When any of the relays 80 is energized, another circuit is also completed through its normally open contacts 80c. Closure of the selected relay contacts 80c completes a circuit from negative terminal 88 directly to diode 74 connected to one of the cathodes 22 of the synaptic matrix. At the time that any selected relay 80 is energized, it opens its contact 80a and this interrupts the previously described positive supply circuit to line 87, any closed relay contact 72b, and the connected anode 20. A substitute positive supply circuit is provided which energizes line 87 when any of the relay contacts 80a are opened. This by-pass circuit includes a manual switch 92 which is deliberately closed for a controlled time period whenever the "pupil" is to learn new responses. Switch 92 extends to relay contacts 84b, which are in turn connected to resistor 89 and the positive terminal 91 of the direct current supply.

Relay 84 is connected to one terminal of power supply 96 and to multiple detectors 94. Detectors 94 are circuit closing devices identified with respective terminals I, II, III, etc. These detectors are provided for checking the correctness of the response of the apparatus at each of the terminals I, II and III, etc. When detectors 94 close in a circuit containing closed relay contacts 72a, a circuit is completed from one terminal of supply 96 to relay 84 to the other terminal of supply 96. Relay contacts 72a store the bits of information that are supplied to the apparatus and detectors 94 compare the response of the apparatus to those supplied bits of information. In the event that there is correspondence, then relay 84 is energized and contacts 84b are closed. Switch 92 is operated to its closed position, and energization of relay 84 causes positive potential to be applied to line 87. Dendrite-growing current then flows via line 87, the closed set of contacts 72b, the selected anode 20, the cathode 22 that has been demonstrated as "desirable," via diode 74 to the closed relay contact 80c and thence to terminal 88. The amount of dendrite growth depends on the values of resistor 89 and supply 88, 91, and on the time during which switch 92 remains closed.

Before attempting a complete description of the operation of "pupil" as illustrated in FIG. 6, it may be helpful to describe an elementary example illustrated by FIG. 7 of a learning process carried out by this apparatus.

An inclined chute 97 is shown in FIG. 7, equipped with a number of sorting gates 98 and receivers 100 for sorted articles. Near the top of chute 97 there are three photocells 102 that are identified respectively with input lines A, B and C of FIG. 6. Further, a series of photocells 104 are associated with respective receivers 100, these photocells 104 forming input-control parts of detectors 94.

Let it be assumed that red, yellow and green objects are to be deposited one at a time at the top of chute 97.

These will cause the photocells 102(A), 102(B), 102(C) which have red, yellow and green filters to respond selectively to such objects. Gates 98 are operated by electromagnets 99 identified with the respective output lines I, II, and III connected to relay contacts 80b of FIG. 6.

It has already been mentioned that "pupil" has a tendency (more fully explained below) to respond at random to a given input bit of information. It may be assumed that the first object presented is a red object and that photocell 102(A) responds. Let it also be assumed that red objects are supposed to go into the first or uppermost bin or receiver 100 and that a non-selective photocell 104(I) is disposed adjacent gate 98(I). Now then, when the first red object is placed on the chute 97 and is identified as red, photocell 102(A) supplies a bit of information to terminal A of "pupil" in FIG. 6. Let it be assumed that the random operation of the circuit does not provide the desired response and that one of the gates 98 other than that identified with the top receiver 100 is raised. When this happens, the red object that was detected by 102(A) is actually discharged into the second or third receiver 100. In so doing, it passes one of the photocells 104(II) or 104(III) associated with such "wrong" receivers. These photocells are the sensing parts of detectors 94. Each relay 72 has its contacts 72a in series with a corresponding or "right" detector 94 that is associated with the prescribed receiver 100. Consequently, when a red object passes photocell 102(A) and thereby provides an input to terminal A of FIG. 6 so as to energize relay 72 and close its contacts 72a, subsequent response of a "wrong" photocell 104 does not produce coincidence between the particular closed contacts 72a and the detector 94 selected by such "wrong" photocell 104. As a result, relay 74 is not energized.

When a photocell 102 is energized by a given-colored object and when "pupil" at random opens the correct trap door 98 so that the correctly delivered object is detected by the corresponding photocell 104, then the circuit in FIG. 6 involving relay contacts 72a and the corresponding detector 94 demonstrates coincidence and energizes relay 84. With switch 92 closed, growth of a dendrite from the proper cathode 22 to the proper anode 20 commences and continues so long as switch 92 is closed.

In the detailed description of FIG. 6 that is to follow, it will be understood that an object may pass the photocells 102 and be delivered to either the correct bin as evidenced by the response of the "correct" photocell 104, or it may be delivered to the wrong bin, as evidenced by lack of response of the right photocell 104. In both instances, delivery of the object to the right or the wrong bin is the result of the random operation of "pupil." The circuit of FIG. 6 operates to effect a learning process so as to enhance or even insure only the correct response of the apparatus on subsequent occasions, depending on the extent of dendrite growth that occurs. The learning process is executed separately for objects of each color, and in each case the learning process in this apparatus enhances or assures the correct response of the apparatus to successive articles of that color. It is notable that the learning process need not be executed by repeatedly presenting articles of a particular color at the top of chute 97, but instead articles of various colors may be presented in any sequence, and the apparatus will learn to respond correctly just the same.

The entire operation of the apparatus as shown in FIG. 6 may now be described. It may be assumed that a bit of information is supplied to one of the input terminals A, and that the desired response to this input information is an output signal at terminal I.

When an information bit is supplied at terminal A, relay 72 related to that terminal is energized and the corresponding sets of relay contacts 72a and 72b are closed. They remain closed because relay 72 is self-latching. Closure of relay contacts 72b impresses positive potential on the corresponding anode 20. Current flows from this anode to all of the cathodes 22, and then via diodes 74 to charge all of the capacitors 78 whose opposite terminals extend to negative terminal 88 of the direct-current power supply. After an appropriate time interval, one of the capacitors 78 is charged to that potential appropriate to cause a random one of the thyratrons 76 to fire. Which thyratron will fire is initially a completely random phenomenon. When a thyratron fires, its relay 80 is energized. This too is a self-latching relay. Relay contacts 80a open, thereby interrupting the flow of current from positive terminal 91 via resistor 89 and line 87 to the particular anode 20 that is energized by the closed relay contact 72b. At the same time that relay contacts 80a open relay contacts 80b close and energize a line I, II, III or . . . and thereby to operate the solenoid 99 and the solenoid-actuated trap door 98 corresponding to the thyratron 76 which fired. The object which left photocells 102, and which moved down the chute 97 while capacitors 78 were charging, then passes the photocell 104 adjacent to the opened trap door 98. If there is a mismatch, as evidenced by lack of response of the correct detector 94 in series with the closed relay contacts 72a, then relay 84 is not energized. At this time there is consequently no positive potential on line 87, relay contacts 80a and 84b both being open. Charging of all capacitors 78 is interrupted.

The latching relays are all reset to initiate the next trial. The apparatus is then in condition for the ensuing article. It is deposited at the top of chute 97 so as to activate one of the photocells 102. Let it be assumed that the same-colored object is again presented. The capacitor 78 corresponding to the previous "wrong" selection (and which discharged through its thyratron) is starting to charge once again, but there is a charge remaining on the other capacitors 78 which were thus left at a relatively high potential. Consequently one of the remaining thyratrons fires, this being another random action. Let it be assumed that this second firing represents the "desired" or "correct" response of this apparatus to the input information. Under these circumstances, the activated photocell 104 of the correct detector 94 in series with the closed set of contacts 72a causes relay 84 to be energized. This causes closure of relay contacts 84b. A circuit can then be traced from the positive terminal 91 of the direct-current power supply via resistor 89, relay contacts 84b, closed switch 92, line 87, and closed relay contacts 72b to the selected anode 20. Electrodepositing current flows from this selected anode to the selected cathode 22 via diode 74 and the closed contacts 80c, to the negative terminal 88 of the power supply. Rapid growth of a dendrite follows, as a result of this current flow. Opening of switch 92 will limit the amount of growth. This dendrite will subsequently assure or at least greatly enhance correct response of the synaptic matrix involving electrodes 20 and 22 by providing a positive connection or at least a preferred current path from the particular input terminal A, B, C to the related output terminal I, II or III. Maximum growth of the dendrite is permitted if the learning process is to be executed in response to the first correct behavior of "pupil" in reaction to a particular detected characteristic. It may be desired to limit the dendrite growth to only part of the ultimate growth desired, in some applications of the apparatus. In that event, switch 92 is opened before the dendrite has bridged the anode and cathode.

When the "desired" response is realized and relay 84 is energized, relay contacts 84a switch the thyratron grids to a direct-current supply terminal 106 that provides a high level of bias for the thyratron grids. This tends to suppress firing of any of the other thyratrons during the growing of a desired dendrite. There is some nominal flow of current at various other electrode cross-overs and the various capacitors 78 continue to charge towards their limiting values, but growth rate of dendrites at undesired electrode cross-overs is of a very low order of magnitude, limited by capacitor displacement current.

Figure 8:
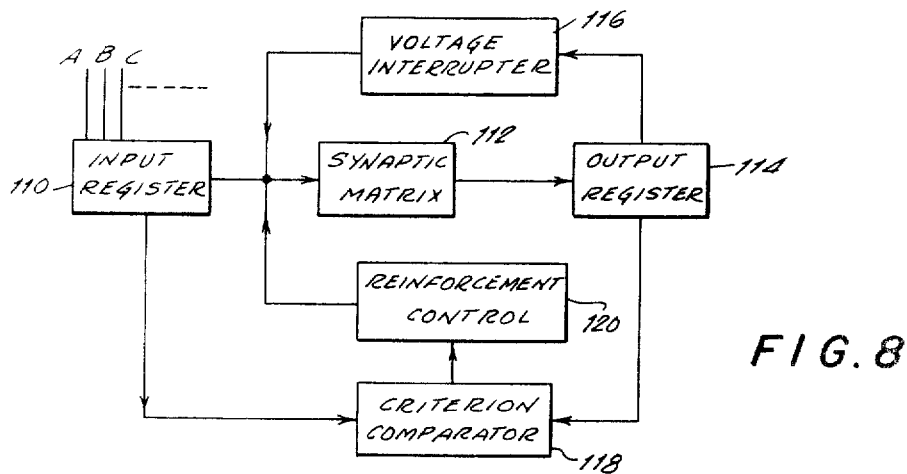
FIG. 8 is a block diagram illustrating certain features of the embodiment in FIG. 6.

The operation of the apparatus in FIG. 6 involves certain unique concepts. This operation is reviewed in connection with the block diagram of the system in FIG. 8. Input register 110 corresponding to relays 72 receives selective bits of information at its input terminals A, B, C, etc. These bits of information are supplied to the synaptic matrix 112, of the form in FIGS. 1 to 3, etc. for example. The output of the synaptic matrix is effective, as a random process initially, to operate part of the output register 114 represented by lines I, II, III etc. and the respective output circuits in FIG. 6. At the moment that output register 114 responds, the operating voltage that is normally supplied to synaptic matrix 112 is interrupted by voltage interrupter 116 corresponding to relay contacts 80a. At the same time, the output register provides an output signal that represents the response of the apparatus. When this occurs, the effect is monitored by criterion comparator 118 (see units 94 and contacts 72a, FIG. 6) in comparison with the information supplied initially to the input register. Where the comparison demonstrates that the performance of the apparatus is not the desired performance, then nothing further takes place. A new sequence of operations is initiated, and in due course the apparatus will produce the desired form of operation. In that event, output from criterion comparator 118 will render reinforcement control 120 effective for enhancing the particular cross-over connection in the synaptic matrix that is in effect when the desired response is realized.

After the system has executed a reasonable number of operations and all of the "right" current paths have been developed or established in the matrix, further operations will be executed directly, without occurrence of "random" operations. The matrix has learned its task. If the scope of responses demanded of the system is subsequently increased, the matrix can learn the added "correct" responses which, once established, become part of the system of selective current paths established.

Another application of the apparatus of FIG. 6 may be of interest. A remote unmanned weather station may be established for the purpose of detecting local meteorological conditions and transmitting such data by radio to a distant manned data collection center. The unmanned weather station is designed to transmit on any one of several different frequencies (e.g. 500 kc., 1500 kc., 10 mc., etc.) which may be designated I, II, III, etc. The selection of any one of the transmitter frequencies is under output-register-control of "pupil" at the unmanned station. Each day may be divided into six 4-hour periods, for example, each specific period being represented discretely in the input register of "pupil." Let us call: 12:00 midnight to 4:00 a.m., input A; 4:00 a.m. to 8:00 a.m., input B; 8:00 a.m. to 12 noon, input C; etc. Initially for any particular time of day, the apparatus would randomly select the radio frequencies by which the meteorological data would be transmitted to the manned data collection center. It is clear, however, that an observer at the manned center can decide which transmission frequency has the highest signal-to-noise ratio and least interference at any given time. By means of a transmitted pulse back to the apparatus for thereby closing switch 92 for a limited period of time, the observer can positively reinforce the input-output connections whenever the apparatus has selected the optimal frequency. In this manner, specific dendritic connections between inputs representing time of day and selected outputs representing optimal transmission frequencies for each time of day will be progressively augmented. After a sufficient number of reinforcements, the unmanned meteorological station will transmit its data only on frequencies which have been found to give the best signal for each time of day. The observer functions as comparator 94.

It will be remembered that in FIG. 5, a separate switch 42 and resistor 40 were provided for each of the output circuits in enabling the "tutor" to deliberately establish the desired response of the apparatus to each input bit of information, by inducing dendrite growth in the synaptic matrix at the part of the matrix that is most directly influenced by operation of a switch 42. Unlike that circuit, the apparatus in FIG. 6 does not include any individual manipulated switch for each response, comparable to switches 42 in FIG. 5 that are manipulated by the "tutor." "Pupil" is capable of teaching itself, in a sense, by automatic comparison of the supplied bits of information with the end effects produced by operation of the circuit. In a less sophisticated application of "pupil," detectors 94 may be omitted and instead an observer may decide when the apparatus has provided the desired responses. In that event, relay 84 is deliberately energized manually. Detectors 94 would be omitted.

The description of the operation of FIGS. 5 and 6 involved a single bit of input information at a given single input terminal and a response at a corresponding single output point. These are not necessarily limitations in the broad application of the present invention. FIG. 9 is an example of an application of certain principles of the invention in which multiple bits of information are provided concurrently at different input terminals and the desired response, preferably realized in a "mimic" type of apparatus, involves response at a single output line. FIG. 9 is suitable for use in character recognition, for example, illustrated in FIG. 10. FIG. 10 includes four numerals "1," "2," "3" and "4." Recognition of each of these numerals as characters depends upon the critical distribution of photocells or the like that are focused at points A', B', C' and D' in FIG. 10. Thus, areas A' and B' of numerals "1" provide bits of information on both lines A, B in FIG. 9. By control of limited dendrite growth, dendrites 122 and 124 that have appreciable resistance are formed between line A and output-line I, and between line B and output line I. Current passes by grown "synapses" or dendrites 122 and 124, which provide parallel current paths to utilization unit 126 on line I. This represents considerably more current than is available from either line A or line B or from both of them to any of the other devices 128, 130 or 132 on lines II, III and IV. This is because there is only one dendrite at 136 from line A to device 128; there is only one dendrite 138 from line B to device 130 on line III; and there is only one dendrite 140 from line A to device 132 on line IV. The sensitivity of the apparatus is adjusted so that, where two-bit input is provided for selection of a single output unit 126, 128, 130 or 132, the current provided by one dendrite-path is inadequate for device operation. Recognition of the character "2" results from energization of photocells at areas A' and C' with resulting dual-path current supply to device 128 via resistive paths 136 to terminal A and 142 to terminal C. In like manner, dual-path control current is developed in response to dual photocell excitation for characters "3" and "4" in selecting output devices 130 and 132. The resistive paths 122, 124, etc. in FIG. 9 are readily developed individually by the means and in the manner described in connection with FIG. 5.

In connection with FIG. 6 it was indicated that switch 92 is manually operated, but it will be appreciated that this switch may be operated by a timer or by other automatic controls.

It is evident that a wide latitude of variation of the foregoing illustrative embodiments of the invention will occur to those skilled in the art, and virtually unlimited applications will be apparent, so that the invention should be construed broadly, in accordance with its full spirit and scope.

What is claimed is:

1. A learning machine including a matrix having two groups of elongated electrodes including a group of non-depositing anodes and a group of cathodes, the groups of electrodes being spaced from each other and disposed in transversely confronting relation to each other, and electrochemical means for establishing dendritic metal current paths between selected electrodes of the two groups, said means including means for applying a potential between an electrode of one group and the electrodes of the other group, and means for selectively augmenting the current flow in the path that includes a selected electrode of said other group.

2. A learning machine in accordance with claim 1, wherein said last-mentioned means includes deliberately operable selective current-control means in circuit with each said electrode of said other group.

3. A learning machine in accordance with claim 1, including means for detecting the preferred curent path through the matrix occurring at random at any given time, and means operable upon such detection for augmenting the electrodepositing current-flow in said preferred current path.

4. A learning machine including a matrix having two groups of electrodes including a group of non-deposition elongated anodes spaced from and transversely confronting a group of elongated cathodes, and electrochemical means for establishing desired current paths between electrodes of said two groups, said means including means for selectively energizing particular electrodes of the two groups.

5. A synaptic matrix, including a plurality of mutually independent elongated input lines, a plurality of mutually independent elongated output lines extending across but spaced from said input lines, and common electrolytic depositing means, all of said input and output lines being immersed therein, operative to establish preferred conducting paths between selected ones of said input and output lines.

6. A synaptic matrix, including a plurality of mutually independent elongated input lines, a plurality of mutually independent elongated output lines extending across but spaced from said input lines, insulating barriers interposed between each input line and the next adjacent input line and between each output line and the next adjacent output line for inhibiting formation of spurious electrodeposited current paths between any pair of input lines and for inhibiting formation of spurious electrodeposited current paths between any pair of output lines.

7. A synaptic matrix having a first group of side-by-side mutualy spaced input lines, a second group of side-by-side mutually spaced output lines confronting but spaced from said first group of lines and extending transverse thereto so as to form cross-overs representing a number of potential cross-connections equal to the number of lines in the first group mutiplied by the number of lines in the second group, electrochemical means for establishing deposited cross-connections at said cross-overs, a third group of lines adjacent to said cross-overs, and electrochemical means including said third group of lines and one of the other two groups for removing previously deposited connections.

8. A teachable matrix, including a plurality of mutually independent elongated conductors arranged in a first group, and plurality of mutualy independent elongated conductors arranged in a second group, the conductors of the second group transversely confronting but being spaced from the conductors of the first group, and electrochemical means for forming selected connections from certain conductors of one group to certain conductors of the other group, said means including an electrolyte between said groups of conductors and means for selectively energizing a particular conductor of the first group in relation to a particular conductor of the second group so as to produce an electrodeposited connection therebetween.

9. An electrochemically teachable matrix, including a plurality of mutually independent elongated non- depositing anodes and a plurality of mutually independent elongated cathodes confronting transversely but reing spaced from said anodes, and electrochemical means including a metallic-ion containing electrolyte between said anodes and cathodes, and means for selectively energizing and thereby establishing an electrodeposited electrical connection from selected anodes to selected cathodes.

10. A synaptic matrix including a first group of mutually spaced elongated conductors and a second group of mutually spaced elongated conductors transversely confronting but uniformly spaced from said first group of conductors and thereby defining multiple cross-overs between said groups of conductors, at least one said group of conductors being bent so as to establish successive layers of cross-overs, and electrochemical means for establishing current paths only at certain of said cross-overs.

11. The method of teaching a synaptic matrix having a first group of lines each of which confronts all the lines in a second group, wherein an electrolyte medium is present between said groups of lines, which includes the steps of subjecting all the lines of one group to potential in relation to a selected line of the other group suitable for forming electrical connections very slowly, and augmenting the effect of such potential in relation to a particular line of said one group for preferentially accelerating the formation of a connection between said selected line and said particular line.

12. The method of teaching a synaptic matrix having a first group of lines each of which confronts and crosses but is spaced from all the lines in a second group, which includes the steps of providing a medium between said groups of lines adapted to form synaptic electrical connection therebetween and selectively energizing a particular line of said one group electrically in relation to a desired line of the other group to form a current path through said medium between said selected line and said desired line.

13. The method of teaching a synaptic matrix having a first group of lines each of which confronts and crosses but is spaced from all the lines in a second group, which includes the step of providing a medium between said groups of lines adapted to form synaptic electrical connection therebetween and selectively energizing particular combinations of lines of said one group electrically in relation to a desired line of the other group to form a current path through said medium between said selected lines and said desired line.

14. A teachable apparatus comprising a synaptic matrix having a first group of elongated mutually spaced lines and a second group of elongated mutally spaced lines confronting but spaced from said first group of lines and extending transverse thereto, thereby to define a number of cross-overs equal to the number of lines in the first group multiplied by the number of lines in the second group, electroresponsive means for producing established current paths at selected cross-overs, said electroresponsive means including said lines of both groups and means for energizing selected lines of one group relative to selected lines of the other group, devices individual to the lines of said second group activated at random in response to energization of a particular line of said first group, and common means cooperating with said individual devices and operable for forming an established current path at a cross-over of an energized line of the first group and a line of the second group identified with an individual device that has been activated.

15. A learning machine including an input register, an output register, a matrix initially capable of establishing all possible output register selections in response to input bits of information supplied to the input register, means for evidencing such responses, and means including said matrix for enhancing initially random selections of the matrix when such selections are recognized as desirable.

16. A learning machine, including an input register, an output register, a matrix initially capable of establishing all possible output selections in response to input bits of information in the input register, means for comparing the actual response of the matrix with prescribed response thereof, and means including said matrix controlled by he comparing means for enhancing the capability of the matrix to repeat a given selection when recognized by the comparing means as a prescribed response.

References Cited

UNITED STATES PATENTS

| | | | |
|---|---|---|---|
| 367,332 | 7/1887 | Baxter | 340—166 |
| 1,547,964 | 7/1925 | Semat | 340—166 |
| 3,172,083 | 3/1965 | Constantine | 340—173 |

ROBERT C. BAILEY, *Primary Examiner.*

G. D. SHAW, *Assistant Examiner.*